March 27, 1962   G. G. ENSIGN ETAL   3,026,734
ELECTRICALLY-POWERED TIME DEVICES
Original Filed April 15, 1952   3 Sheets-Sheet 1
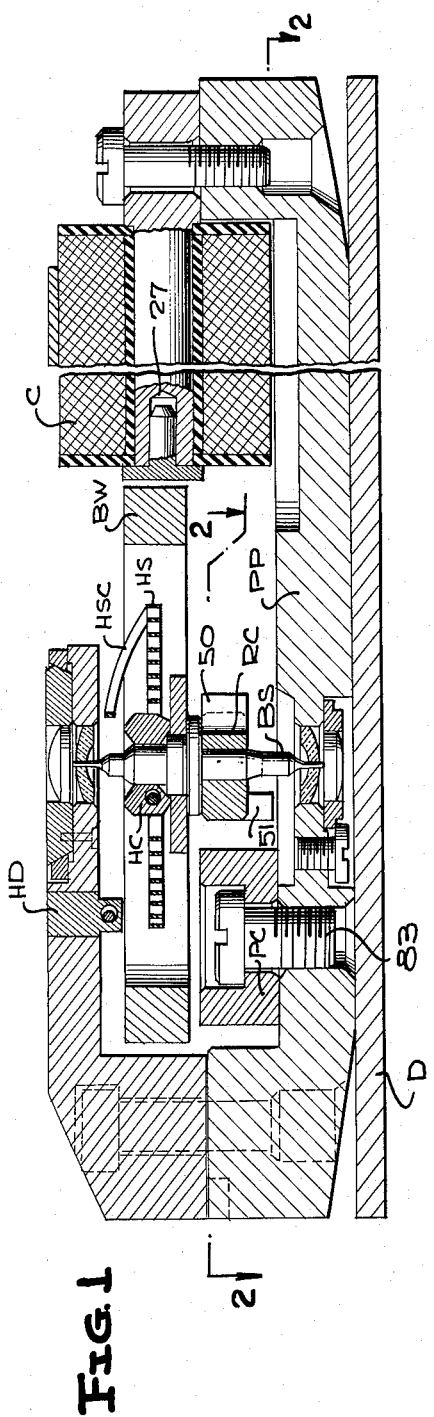
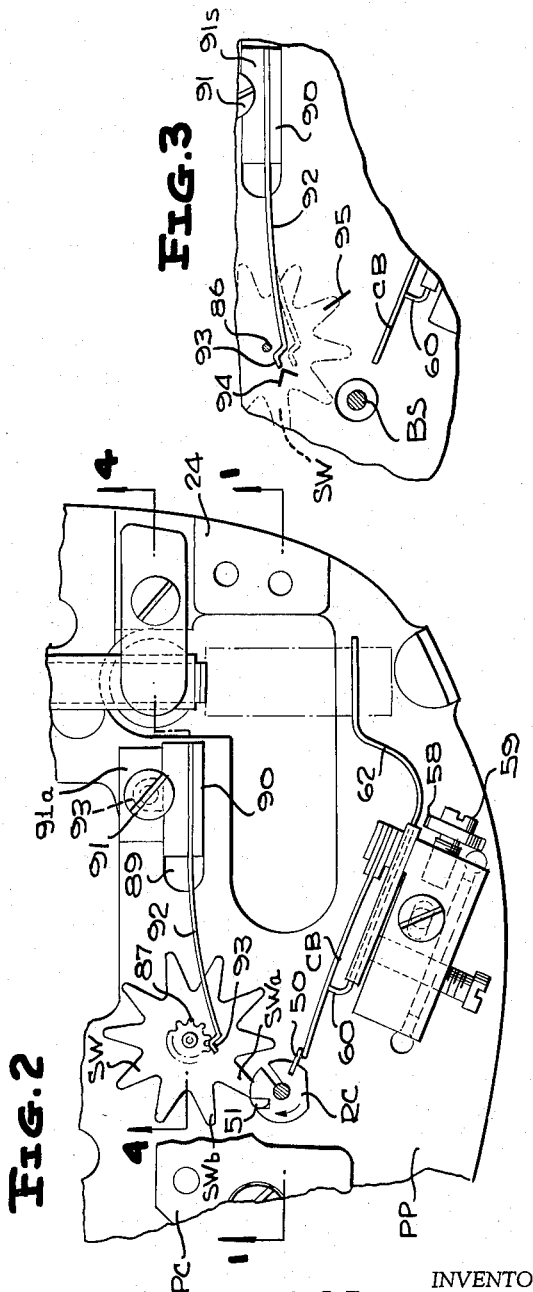
INVENTORS
G. G. ENSIGN,
G. T. SOPER &
O. LUNDAHL
BY  Mason, Porter, Diller & Stewart,
ATTORNEYS March 27, 1962  G. G. ENSIGN ETAL  3,026,734
ELECTRICALLY-POWERED TIME DEVICES
Original Filed April 15, 1952  3 Sheets-Sheet 2
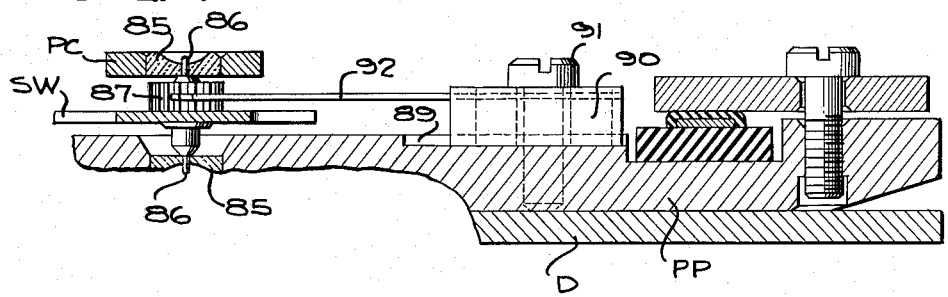
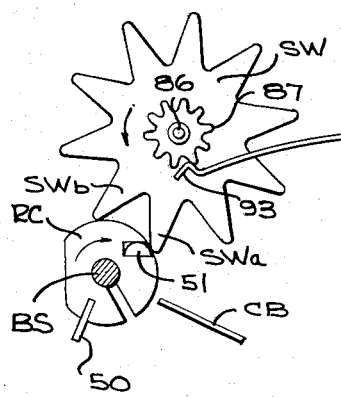
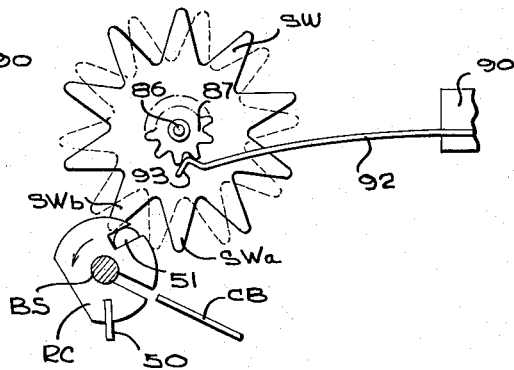
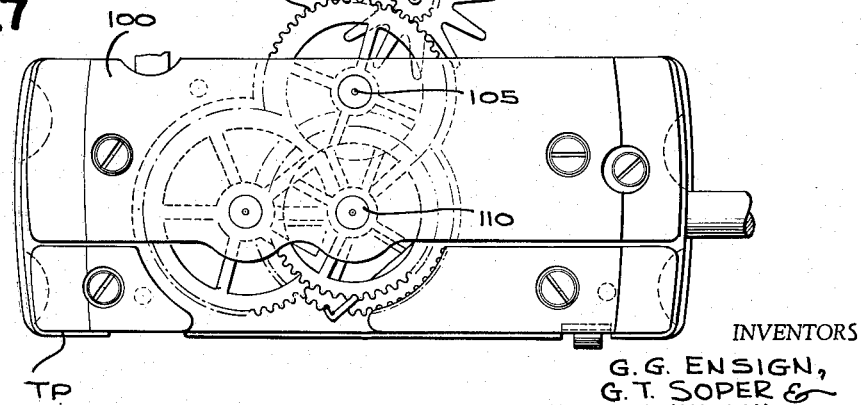
INVENTORS
G.G. ENSIGN,
G.T. SOPER &
O. LUNDAHL
BY Mason, Porter, Diller & Stewart,
ATTORNEYS March 27, 1962    G. G. ENSIGN ETAL    3,026,734
ELECTRICALLY-POWERED TIME DEVICES
Original Filed April 15, 1952    3 Sheets-Sheet 3
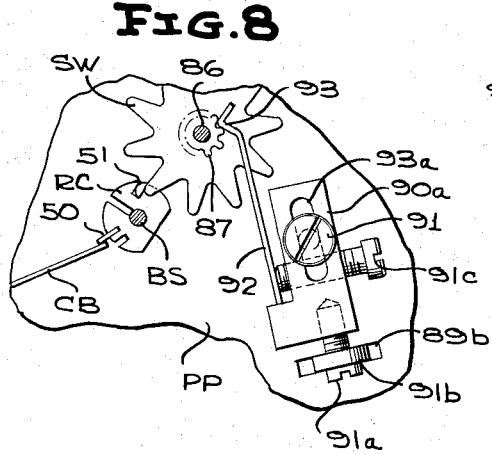
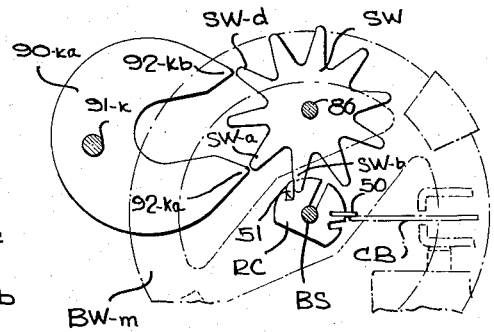
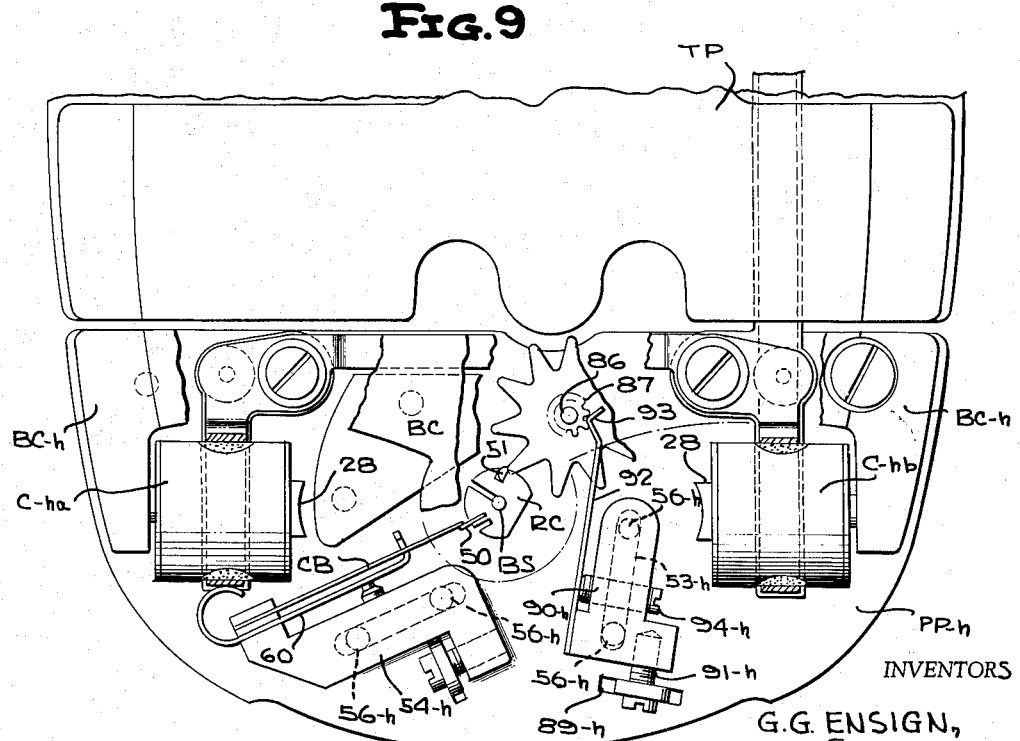
INVENTORS
G.G. ENSIGN,
G.T. SOPER &
O. LUNDAHL
BY Mason, Porter, Diller & Stewart,
ATTORNEYS

United States Patent Office 3,026,734
Patented Mar. 27, 1962

3,026,734
ELECTRICALLY-POWERED TIME DEVICES
George G. Ensign, Glenn T. Soper, and Ossian Lundahl, Elgin, Ill., assignors to Elgin National Watch Company, Elgin, Ill., a corporation of Illinois
Original application Apr. 15, 1952, Ser. No. 282,388, now Patent No. 2,865,163, dated Dec. 16, 1958. Divided and this application Dec. 22, 1958, Ser. No. 788,703
9 Claims. (Cl. 74—126)

This invention relates to electrically actuated time measuring devices, and is particularly concerned with a power take-off mechanism for driving a train from an oscillating balance element.

This application is a division of our copending application, Serial No. 282,388, filed April 15, 1952 now U.S. Patent No. 2,865,163.

Many previous proposals and structures have been made in which an electrical battery serves to maintain a balance or like system in oscillation and to operate a time-indicating train. Some commercial structures have been devised for conditions where no limitations of sizes or power requirements are present, for example clocks; while others have had minor restrictions on one or more of the size dimensions, for example automobile clocks, wherewith the current is supplied from the automobile battery and may amount to even several watts; and yet others have been made to operate from a single standard flashlight cell, with the minor restriction of providing space for such a cell and of having mechanical parts which do not so rapidly drain the cell that the timepiece requires cell replacement frequently. As a general rule, the commercially available devices have required electrical power of the order of a milliwatt as a minimum.

A feature of this invention is the provision of an actuated oscillatory balance element, a train including a star wheel, and means carried in movement with the said balance element for moving the ratchet and effecting a continued forward movement of the train.

Another feature is the provision of a chronometric mechanism comprising an oscillatory rate-determining member and a power take-off device including an element moved to and fro by said member, the forward movement being greater than the retrograde movement, and means cooperative with said element for accurately positioning the same for movement by said member.

A further feature is the provision of a chronometric mechanism comprising a frame, an oscillatory rate-determining member on said frame, a power take-off device on said frame and including an element moved by said member, and means on the frame for designating in the absence of said element the proper positioning of parts of said device.

With these and other features as objects in view, as will appear in the course of the following description and claims, illustrative practices in accordance with this invention are shown in the accompanying drawings, in which:

FIGURE 1 is a sectional view substantially on line 1—1 of FIG. 2;

FIGURE 2 is a sectional view substantially on line 2—2 of FIG. 1;

FIGURE 3 is a fragmentary view of the pillar plate, with the balance parts, star wheel cock, star wheel, and star wheel pinion removed;

FIGURE 4 is a sectional view substantially on line 4—4 of FIGURE 2, showing the location of a locating spring;

FIGURES 5 and 6 are views corresponding to parts of FIGURE 2, and showing the star wheel and cooperating pin in other positions of movement;

FIGURE 7 is a plan view of a train sub-assembly, from the side opposite the dial, to show the drive thereto;

FIGURE 8 is a plan view, corresponding to a part of FIGURE 2, showing another form of adjustment for a locating spring;

FIGURE 9 shows another form of structure in a sectional view corresponding to FIGURE 2;

FIGURE 10 is a sectional view, corresponding to FIGURE 2, showing a further modified star wheel centering device.

It will be understood that certain structures and parts are shown by parts only, for clearness of the elements of the instant invention.

A power unit base or pillar plate PP, a dial D, a train assembly on a train unit base plate TP, a balance cock BC, a hair spring HS or collet HC has an over-coil HSC connected to stud HD, a collet RC on a balance staff BS and having a contact jewel 50 and a train driving pin 51 are present in FIGS. 1 and 2. An electrical coil C has a core 27 with pole piece 28 for magnetically impulsing the balance wheel rim BW. The contact system for energizing the coil C includes a contact blade CB which is moved by the pin 50 as the balance oscillates, and cooperates with a fixed contact 60 connected to conductor 62 and thus establishing circuit from a battery (not shown) to the coil C: a screw 59 permiting adjustment of the arcuate distance of engagement of pin 50 with the blade CB.

The base plate PP supports a star wheel cock PC, held in place by a screw 83 and steady pins. This star wheel cock PC (FIG. 1) has a bearing 85 which cooperates with bearing 85 in the base plate PP to support the star wheel pinion 87 hving the pivots 86 and supporting the star wheel SW, which in the illustrative form has ten teeth which successively come into the path of movement of the axially extending jewel pin 51 on the collet RC on the balance staff BS. In the illustrated form, the shapes and sizes of the teeth in pinion 87 and in the transfer wheel 106 meshing therewith provide a permissive back lash of 7 degrees in the pinion 87. A block 90 is mounted in a groove 89 (FIGS. 2 and 4) on the base plate PP and is held fixed by a screw 91 passing through a hole 93 in an elevation 91s on the base plate PP, so that its head binds the block 90 and supports a locating spring 92 having a bent free end, with a bight 93 positioned for engagement in the gaps between adjacent teeth of the pinion 87, and effective for acting against these teeth for positioning the successive star wheel points in a predetermined angular position relative to the line between the axes of staff BS and pinion 87, while the star wheel is momentarily at rest. By loosening the screw 91, and moving the block 90 along the groove 89, the position of the end of the locating spring 92 may be shifted, and therewith the angular positions occupied by the pinion 87 and the star wheel SW while at rest, thus controlling the position of the star wheel points, illustratively SWa, at the instants of engagement by the jewel pin 51.

It is preferred to provide witness marks for assistance in preliminary setting and adjusting these parts. As shown in FIG. 3, this can be accomplished by having a mark 94 on the base plate PP, so located that when the locating spring is without tension, e.g. with the pinion 87 removed, the end of the spring 92 is at the witness line 94 as shown by the full line position of the spring 92; this assures that a proper tension, neither too high nor too low, is present in the spring 92 when in its position (dotted lines) of cooperation with the pinion 87. Further, the witness mark 94 can have a branch to indicate a proper position of the bight 93, to which the bight is brought by sliding adjustment of the block 90 and there held by the clamping screw 91, preliminary to the mounting of the star wheel pinion, star wheel, and star wheel cock; this position permits determination by inspection as to proper overlap of the jewel pin 51 and the points of the star wheel. Further, a witness mark 95 is placed on the base plate PP at a point visible past the balance cock BC and star wheel cock PC, and past balance parts, for a final accurate adjustment of the proper position of the star wheel points while at rest: which position is attained and assured by loosening the clamping screw 91, causing a further minor movement of block 90, and then clamping the same again. It thus is possible to obtain highly accurate settings without operational movements of the parts.

The balance system oscillates in the usual fashion. It receives an impulse magnetically at each cycle of oscillation. Therewith, the roller collet RC moves its jewel pin in a path which intersects the points of the star wheel SW, and thus the train is driven as shown in FIGS. 2, 5 and 6.

In FIG. 2, the parts are shown at neutral axis, that is, in the position at the start of the indexing movement of the star wheel SW, the balance system being assumed in its clockwise stroke as indicated by the arrow. At the start of the indexing movement, the jewel pin 51 encounters one point, illustratively point SWa, of the star wheel, and produces a relative counterclockwise movement of this star wheel by an angular distance of, for example, slightly greater than 20 degrees for a star wheel having ten points; and then the jewel pin 51 in its circular path leaves the path of the tip of the star wheel point SWa (FIG. 5) and the balance system continues in its clockwise stroke without further action upon the star wheel. While the star wheel was at rest (FIG. 2), the locating spring 92 had its bight 93 engaged in the gap between two teeth of the pinion 87, to assure the proper presentation of the illustrative point SWa for engagement by the jewel pin 51. When the star wheel SW is driven as stated, a tooth of the pinion 87 acts on the locating spring 92 to press it away from the pinion axis; and when the jewel pin 51 (FIG. 5) is about to leave the path of the tip of the star wheel point SWa, this locating spring 92 has not yet returned relatively inwardly into deepest position in the next tooth gap of the pinion 87, but is presenting an inclined surface against the pinion tooth which has just passed (FIG. 5), and the locating spring 92 now acts upon the star wheel system concurrently with the action of the jewel pin 51 upon the star wheel point SWa, and the star wheel is thus accelerated in its motion, and draws away from the jewel pin 51 until the locating spring 92 has fully entered and engaged in this next tooth gap of pinion 87. Thus, the locating spring 92 now holds the star wheel in its rest position, but with the next succeeding point SWb occupying the position previously occupied by point SWa in FIG. 2; i.e. a star wheel movement of 36 degrees has occurred. This acceleration of the star wheel also serves to remove the train load from the jewel pin 51.

Simultaneously with the power take-off by the action of jewel pin 51 upon the respective star wheel point, the fin 50 is causing closure of electrical contact by the blade CB, and therewith impulsing is occurring: so that a part of the electromagnetically induced force or impulse upon the balance is being immediately employed for the train drive, and the balance is in effect a coupling member for transmission of the train-driving power from the motor stator to the star wheel without storage of this power in the balance. Further, the contact fin 50 acts through an arc of 12 to 15 degrees, in a permissible adjustment of the blade CB, and this is distributed about equally at each side of neutral axis so that little effect is produced for changing the balance system from its natural rate.

During the return or idle stroke of the balance system in the illustrative form, the jewel pin 51 passes the star wheel point SWa (FIG. 6), which has just been pushed forward, but engages against the forward edge of the succeeding star wheel point now SWb, and causes a retrograde rocking movement of the star wheel SW by an angle of, say, 7 degrees into the dotted line position of FIG. 6, and then escapes therefrom. During this retrograde movement, the aforesaid illustrative backlash permits movement of the pinion 87 without producing a retrograde movement of the wheel 106 meshing therewith. This minor retrograde movement of the star wheel SW has caused the pinion 87 to lift the locator blade 92 slightly, but upon escape of the jewel pin 51, the locating spring 92 again restores the star wheel to the normal rest position of FIG. 2, but now with the point SWb in the position previously occupied by the point SWa in the prior cycle.

The step-by-step advancement of the star wheel, through total angles of 36 degrees for each intermittent movement of the illustrative ten-point star wheel SW, continues, and the pinion 87 transfers this movement into the train structure of FIG. 7 by producing movement of the wheel 106 pivoted at 105 in the train plate TP and the top plate 100, and therewith movement of the seconds, minutes, and hours hands located on staffs as usual at the movement center 110.

The modified structure of FIG. 8 shows another manner of supporting and adjusting the locating spring 92, in which the locating spring 92 is supported by a block 90a having a slot 93a for the locking screw 91. A screw 91a is threaded into the block 90a and has its axis substantially parallel to the base plate PP and to the spring 92, with its collar 91b engaged in a notch 89b of the base plate, wherewith the screw 91a can be rotated for moving the block 90a toward and from the axis of the star wheel, for adjusting the angular position of the star wheel points. This form of construction also includes a screw 91c engaged in the block 90a, and bearing against the locating spring 92, wherewith adjustment may be made of the spring tension being exerted against the faces of the teeth of the pinion 87.

In another modification, a star wheel cock PCh (FIG. 9) is mounted on the base plate PPh and supports one end pivot 86 of the star wheel pinion 87 on which is mounted the star wheel SW, the pinion and star wheel each having ten teeth as before. The balance staff BS is mounted in the base plate PPh and the balance cock BCh, parts of the latter being broken away to reveal underlying parts: the collet RC as before carries the pin 51 for driving the star wheel W, and the jewel pin 50 for actuating the contact blade CB. The locating spring 92 has the part 93 engaged in the gaps between pinion teeth and is mounted on a block 90h which can be moved on the base plate PPh relatively toward and from the axis of the star wheel by a screw 91h having a collar engaged in a groove 89h of the base plate. In this form of construction, as in FIG. 8, there is adjustment of the locating spring not only in the direction of its length for thereby determining the position of the points of the star wheel SW, but also a screw 94h extends through the block 90h and can be employed for controlling the relative pressure of the locating spring 92 upon the teeth of pinion 87. The star wheel SW presents its points successively for engagement by the jewel pin 51 as before, and operates as a power take-off element in like manner.

In FIG. 9, the adjustable sliding blocks 54h, 90h are shown as held in adjusted position each by a pair of screws 56h and thereby determine the engagement of the contact blade CB with the contact jewel 50 and position of the star wheel relative to the pin 51. In this form, the two coils Cha and Chb are connected in series with the contact blade CB, contact 60, and battery (not shown).

In the form shown in FIG. 10, the star wheel SW is of magnetizable material of low remanence or permanent magnetism. The magnet 90ka is of horseshoe shape, and is adjustably held to the base plate PPk by a screw 91k; its pole ends 92ka, 92kb are opposite star wheel points SWa, SWd. The operation is essentially as follows: In this form the balance staff carries the collet RC with its pin 51 to engage the teeth of the star wheel SW, and pin 50 to actuate the contact blade CB: as well as the balance wheel BWm.

With this arrangement, when the jewel pin 51 encounters a star wheel point at position SWb, the star wheel is caused to move through an angle of about 20 degrees, with resistance against motion due to the attraction between the magnet pole 92ka and the point which has been at the position SWa, and between magnet pole 92kb and the point which has been at position SWd, this resistance decreasing as the magnetic gap increases. After moving the star wheel SW through an angle of 20 degrees, then the points which are respectively approaching the positions SWa and SWd are attracted with greater force than the points which are leaving these positions, and accordingly the star wheel is moved forward, freeing the jewel pin 51 of load. This forward movement may exceed the total 36 degrees between successive points with a star wheel of ten points, but the magnet poles 92ka, 92kb maintain control, and the star wheel SW is brought to a standstill, after decremental oscillations, with its next succeeding point at the position SWa as at the beginning. This has caused a movement of the star wheel SW by one tooth, and this motion is transmitted through the train to the indicating hands.

During the return stroke oscillation of the balance, the jewel pin 51 misses the tooth at position SWc but encounters the tooth which is at the position SWb, and forces it in a retrograde movement through an angle of about 7 degrees, and therewith the star wheel points which are at the positions SWa, SWd are also moved retrograde and away from the magnet poles 92ka, 92kb. This permits the jewel pin 51 to return, without producing a retrograde stepping of the star wheel SW by a full point space. When the jewel pin 51 escapes from the star wheel point which it has been moving, the magnet pole 92ka, for example, now attracts the adjacent point back to the position SWa, and holds it thereat ready for a further forward motion of the star wheel by the next engagement of the jewel pin 51 with the star wheel point at the position SWb.

Angular adjustment of the magnet 90k about its securing screw-pivot 91k permits fixing the standstill positions occupied by the star wheel points relative to the plane through the axes of the balance system and of the star wheel pivots 86.

Structures, such as jewel bearings, commonly employed in high grade horological movements, have not been set out in detail, and it will be understood to the expert that such may be included in structures without departing from this invention.

The foregoing description, and the accompanying drawings show illustrative forms of construction according to this invention, but it will be understood that these forms are not restrictive, and that the invention may be practiced in many ways within the scope of the appended claims.

What is claimed is:

1. An electrically actuated timepiece including a frame, a balance system having a balance and electro-magnetic means for maintaining the same in oscillation, a star wheel mounted on said frame for rotation, a part carried in oscillation with the balance for engaging and advancing the star wheel step-by-step, variable means effective to control the rest position of the said star wheel between engagements of the said part therewith; and means for fixing said variable means in selected position.

2. An electrically actuated timepiece including a frame, a balance system including a balance and mounted on the frame and electro-magnetic means for maintaining the same in oscillation, a star wheel, a collet carried in oscillation with the balance and having a part for engaging and advancing the star wheel step-by-step, a star wheel cock mounted on the frame and extending between the balance and star wheel, said star wheel being rotatably mounted in the frame and in the star wheel cock, variable means effective to control the rest position of the star wheel between engagements of the said part therewith; and means for fixing said variable means in selected position.

3. An electrically actuated timepiece including an impulse-actuated electromotive structure with an oscillating member and an elastic element cooperating with said member for determining the normal rate of oscillation thereof, a driving element carried in oscillation synchronously with said member, a star wheel having teeth for successive actuation by said driving element, a device cooperating with the star wheel to move the star wheel when not being driven by the driving element and to assure the same the presentation of the successive points with the respective radius thereof at a predetermined angular relation to the line between the member axis and the star wheel axis, and means for regulating the position of said device whereby to vary and fix said angular relation.

4. Timepiece including a frame, a balance and hairspring assembly on the frame, an actuator carried in oscillation synchronously with the balance, a star wheel and pinion assembly removably mounted for rotation on the frame, a spring for engaging the pinion and determining the rest position of the star wheel whereby the successive points thereof are positioned for engagement by the actuator, means for adjustably supporting the spring on the frame, and a witness mark on the frame effective in the absence of the star wheel assembly for showing the proper adjusted position for the spring with respect to the desired rest position of the star wheel teeth.

5. Timepiece including a frame, a balance and hairspring assembly on the frame, an actuator carried in oscillation synchronously with the balance, a star wheel and pinion assembly removably mounted for rotation on the frame, a spring for engaging the pinion and determining the rest position of the star wheel whereby the succesive points thereof are positioned for engagement by the actuator, means for adjustably supporting the spring on the frame, and a witness mark on the frame and spaced relative to the star wheel axis and effective in the absence of the star wheel assembly for indicating the proper spacing of the spring relative to said axis to control the desired force that said spring will exert upon said pinion.

6. Timepiece including a frame, a balance and hairspring assembly on the frame, an actuator carried in oscillation synchronously with the balance, a star wheel and pinion assembly removably mounted for rotation on the frame, a spring for engaging the pinion and determining the rest position of the star wheel whereby the successive points thereof are positioned for engagement by the actuator, means for adjustably supporting the spring on the frame, said spring having a bight for engaging adjacent teeth on the pinion, and a witness mark on the frame extending away from the star wheel axis and cooperative with the star wheel points for indicating the proper successive rest positions of the star wheel.

7. In a horological apparatus having a frame and an oscillatory time-keeping element, a part moving in an arcuate path with said oscillatory element, a star wheel having teeth moving in a path intersecting with the path of said element whereby the element can advance the star wheel tooth by tooth during its own oscillatory motion in the forward direction, a variable centering device effective to hold the star wheel with the successive teeth in a predetermined position except during engagement thereof by said element, said predetermined position for the successive teeth being offset from the line between the axes of the oscillatory assembly and of the star wheel, said centering device permitting a minor retrograde movement of the star wheel upon contact by said element during the retrograde part of the oscillation and thereafter being effective to restore the star wheel to the said predetermined position, and means for fixing said centering device, whereby to establish said predetermined position.

8. An electrically actuated timepiece including an electrically powered oscillatory motor, a train and an indicator, a take-off device including a member moved to and from said motor, the forward strokes being longer than the retrograde strokes, said member being in driving connection with said train, a motion restricting device operative to prevent retrograde movement of said indicator, variable means effective to control the rest position of said member between strokes, and means for fixing said variable means in selected position.

9. An electrically actuated timepiece including a frame, an oscillatory electromotive structure on said frame and including an element moving in an oscillatory path, a rotatable star wheel assembly on the frame having its points movable in a path intersecting said oscillatory path, a spring-pressed device cooperative with the star wheel assembly for determining the rest position of the star wheel points, and a movable support on the frame for said device, said support when moved being effective to vary the rest position and therewith the angular presentation of the points for determining the position of the element in its path at which it encounters the star wheel points.

References Cited in the file of this patent

UNITED STATES PATENTS

| 1,964,857 | Neumann | July 3, 1934 |
| 2,266,015 | Fink | Dec. 16, 1941 |

FOREIGN PATENTS

| 578,457 | Germany | May 24, 1933 |
| 1,168,408 | France | Jan. 12, 1957 |